(12) United States Patent
van de Haar et al.

(10) Patent No.: US 11,566,693 B2
(45) Date of Patent: Jan. 31, 2023

(54) VALVE WITH A LOCKED SET SCREW THAT IS COVERED WITH A CAP HAVING A ROTATION SPACE FITTING FREELY OVER A NUT AND A FEMALE THREADED PORTION SCREWED ONTO THE SET SCREW

(71) Applicant: Asco Controls B.V., Ede (NL)

(72) Inventors: Willem van de Haar, Elst (NL); Henk Bakker, Driel (NL); Robbie van Kommer, Doorn (NL)

(73) Assignee: Asco Controls B.V., Ede (NL)

( * ) Notice: Subject to any disclaimer, the term of this patent is extended or adjusted under 35 U.S.C. 154(b) by 505 days.

(21) Appl. No.: 16/373,764

(22) Filed: Apr. 3, 2019

(65) Prior Publication Data

US 2019/0309837 A1   Oct. 10, 2019

(30) Foreign Application Priority Data

Apr. 5, 2018 (NL) ..................................... 2020722

(51) Int. Cl.
  *F16K 27/02* (2006.01)
  *F16B 35/00* (2006.01)
  (Continued)

(52) U.S. Cl.
  CPC ........... *F16H 25/24* (2013.01); *F16B 41/005* (2013.01); *F16K 11/048* (2013.01); *F16K 11/16* (2013.01);
  (Continued)

(58) Field of Classification Search
  CPC ...... F16H 25/24; F16B 41/005; F16B 5/0275; F16B 35/005; F16B 37/14; F16B 43/00;
  (Continued)

(56) References Cited

U.S. PATENT DOCUMENTS

| 1,254,514 | A | * | 1/1918 | Lehmann | ................ | F16B 37/14 |
| | | | | | | 138/89.4 |
| 1,460,250 | A | * | 6/1923 | Kraft | ..................... | B60C 29/066 |
| | | | | | | 138/89.3 |

(Continued)

FOREIGN PATENT DOCUMENTS

| CN | 200993259 Y | 12/2007 |
| CN | 203670969 U | 6/2014 |

(Continued)

OTHER PUBLICATIONS

Search Report and WrittenOpinion for corresponding Application No. NL 2020722, dated Dec. 3, 2018, 11 pages.

*Primary Examiner* — Craig J Price

(74) *Attorney, Agent, or Firm* — Hoffmann & Baron, LLP (57) ABSTRACT

A valve includes a set screw that is screwable into and out of a complementary female threaded opening in a valve part for changing a setting of the valve, for changing an adjustable flow restriction of the valve, in which the set screw includes a free outer end that projects outside the valve part, and a gripping part on its free outer end for a tool to be engageable thereupon. The free outer end of the set screw includes a male thread onto which a locking nut is screwed. A protective cap is provided for covering the free outer end, that includes a first cap portion with a rotation space for fitting freely rotatable over the locking nut, and a second cap portion with a complementary female thread that is screwed onto the male thread towards a locked position.

9 Claims, 9 Drawing Sheets

(51) Int. Cl.
*F16H 25/24* (2006.01)
*F16K 31/122* (2006.01)
*F16K 99/00* (2006.01)
*F16K 11/16* (2006.01)
*F16K 35/10* (2006.01)
*F16K 11/048* (2006.01)
*F16B 41/00* (2006.01)
*F15B 13/04* (2006.01)
*F16K 27/08* (2006.01)
*F16B 37/14* (2006.01)
*F16B 5/02* (2006.01)
*F16B 23/00* (2006.01)

(52) U.S. Cl.
CPC ........ *F16K 11/161* (2013.01); *F16K 27/0263* (2013.01); *F16K 31/1221* (2013.01); *F16K 31/1223* (2013.01); *F16K 35/10* (2013.01); *F16K 99/0015* (2013.01); *F15B 13/0405* (2013.01); *F16B 5/0275* (2013.01); *F16B 23/0069* (2013.01); *F16B 35/005* (2013.01); *F16B 37/14* (2013.01); *F16K 27/08* (2013.01); *Y10T 137/7062* (2015.04); *Y10T 137/7069* (2015.04)

(58) Field of Classification Search
CPC .... F16B 23/0069; F16K 11/048; F16K 11/16; F16K 11/161; F16K 27/0263; F16K 31/1221; F16K 31/1223; F16K 35/10; F16K 99/0015; F16K 27/08; F15B 13/0405; B25B 13/486; B25B 13/485; Y10T 137/7065; Y10T 137/6109; Y10T 137/7062; Y10T 137/7069; Y10T 137/7256
USPC ...... 137/315.41, 382.5, 384, 385; 411/371.2, 411/427, 910, 428, 429, 431, 372.6, 377; 81/121.1
See application file for complete search history.

(56) References Cited

U.S. PATENT DOCUMENTS

| | | | | |
|---|---|---|---|---|
| 1,491,485 A * | 4/1924 | McKenzie | ............. | B60C 29/06 138/89.1 |
| 1,767,884 A | 6/1930 | Heinrich | | |
| 2,538,483 A * | 1/1951 | Summers | ................. | A47G 3/00 411/374 |
| 2,726,009 A * | 12/1955 | Murdock, Sr. | ....... | B65D 90/024 411/429 |
| 2,774,385 A | 12/1956 | Rabaseda | | |
| 3,241,427 A * | 3/1966 | Bosler | .................... | F16B 37/14 411/374 |
| 3,548,704 A * | 12/1970 | Kutryk | ................... | F16B 37/14 411/927 |
| 3,556,144 A * | 1/1971 | Bickers | ............... | F15B 13/0405 137/884 |
| 4,164,241 A * | 8/1979 | Kubo | ........................ | F16K 27/12 137/377 |
| 4,239,710 A | 12/1980 | Sato | | |
| 4,302,137 A * | 11/1981 | Hart | .................... | F16B 23/0069 411/432 |
| 4,557,654 A * | 12/1985 | Masuda | .................. | F16B 37/14 411/431 |
| 4,567,634 A * | 2/1986 | Landry | ................... | B25B 27/26 D8/24 |
| 4,726,723 A * | 2/1988 | Bainbridge | ......... | F16B 23/0007 411/432 |
| 4,824,305 A * | 4/1989 | McCauley | ................ | B60B 7/00 411/372 |
| 4,907,929 A * | 3/1990 | Johnston Jr. | ........... | F16B 37/14 411/908 |
| 4,968,202 A * | 11/1990 | Lanham | .................... | B60B 7/00 411/377 |
| 5,071,300 A * | 12/1991 | McCauley | .............. | F16B 39/12 411/222 |
| 5,287,874 A * | 2/1994 | Dixon | ..................... | F16K 35/10 137/382 |
| 5,329,959 A * | 7/1994 | Owen | ...................... | F16K 35/06 137/315.17 |
| 5,380,070 A * | 1/1995 | FitzGerald | ............... | B60B 7/00 411/374 |
| 5,590,992 A * | 1/1997 | Russell | ..................... | B60B 7/14 411/374 |
| 5,597,010 A * | 1/1997 | Hoffman | ................. | F16K 27/08 137/327 |
| 5,630,687 A * | 5/1997 | Robinson | ................ | F16K 27/08 411/372.6 |
| 5,749,690 A * | 5/1998 | Kutz | ...................... | F16B 41/005 411/431 |
| 5,791,371 A * | 8/1998 | Kemp, II | ................ | B60C 29/06 137/233 |
| 6,053,683 A * | 4/2000 | Cabiran | ................... | F16B 37/14 411/372.6 |
| 6,062,787 A * | 5/2000 | Maddalena | ........... | B25B 13/485 411/373 |
| 6,135,691 A * | 10/2000 | Nadarajah | ............... | F16B 37/14 411/372.6 |
| 6,176,255 B1 * | 1/2001 | Robinson | ................ | F16B 37/14 137/327 |
| 6,910,355 B2 * | 6/2005 | Swanson | ............... | F16B 41/005 411/374 |
| 7,278,341 B1 * | 10/2007 | Novin | .................... | B25B 13/065 411/428 |
| 7,445,413 B2 * | 11/2008 | Niederhageboeck | ... | F16B 39/28 411/216 |
| 7,445,414 B1 * | 11/2008 | Notaro | .................. | F16B 41/005 411/432 |
| 8,002,508 B2 * | 8/2011 | Reed | ....................... | F03D 13/10 411/431 |
| 8,633,391 B2 * | 1/2014 | Strong | .................... | F16B 37/14 174/137 R |
| 8,905,060 B2 * | 12/2014 | Schlesinger | ........... | F16K 35/10 137/382 |
| 9,222,490 B2 * | 12/2015 | Fishwick | ............ | F15B 13/0422 |
| 9,239,072 B1 * | 1/2016 | Andersen | ............ | F16B 23/0069 |
| 9,841,112 B2 * | 12/2017 | Bakker | ................ | F16K 11/161 |
| 9,939,006 B2 * | 4/2018 | Song | .................... | B64D 37/06 |
| 10,054,150 B2 * | 8/2018 | Kim | ...................... | F16B 37/14 |
| 10,948,004 B2 * | 3/2021 | Auffinger | .............. | F16B 37/14 |
| 2006/0086916 A1 * | 4/2006 | Falls | ..................... | F16K 35/06 251/91 |
| 2017/0268684 A1 * | 9/2017 | Gross | .................... | F16K 35/10 |
| 2019/0240814 A1 * | 8/2019 | Krasnik | ................. | B25B 13/5091 |

FOREIGN PATENT DOCUMENTS

JP    2004-270784 A    9/2004
WO    2016/038162 A1    3/2016

* cited by examiner

Fig. 1

Prior Art

Fig. 2

Prior Art

Fig. 3

Prior Art

VALVE WITH A LOCKED SET SCREW THAT IS COVERED WITH A CAP HAVING A ROTATION SPACE FITTING FREELY OVER A NUT AND A FEMALE THREADED PORTION SCREWED ONTO THE SET SCREW

CROSS-REFERENCE TO RELATED APPLICATIONS

This application claims the benefit of Netherlands Application No. 2020722, filed Apr. 5, 2018, the contents of which is incorporated by reference herein.

FIELD OF THE INVENTION

The invention relates to the field of valves, preferably for on/off and/or control applications, and of a type that comprises a set screw, also referred to as an adjusting screw, which set screw is desired to be protected, for example against random or wrong adjustment and/or tampering.

BACKGROUND OF THE INVENTION

For example WO 2016/038162 discloses a three-position booster valve having a quick exhaust option that is provided with a pilot pressure operated piston-cylinder control system for moving supply and exhaust valve cores between open and closed positions. Such three-position booster valves for example can be used as volume booster for operating a pneumatic or hydraulic actuator of a large valve positioner in a pipeline. A pilot port is provided that connects to one side of the piston-cylinder control system for moving the valve cores in response to a pilot signal coming from the pilot port. The control system further comprises medium passages that connect opposing sides of the piston-cylinder control system to inlet and outlet ports respectively. One of those passages forms a bypass between the pilot pressure and the outlet pressure. Certain bleed may occur through this bypass which may limit overshoot of the outlet pressure and thus may help to limit peak forces. An adjustable restriction is provided in one of those medium passages. This adjustable restriction is formed by a bypass set screw which can be screwed further into or out of the passage in order to set an amount of restriction inside the passage. Thus the bypass set screw makes it possible to affect a reaction curve of the control valve.

A disadvantage herewith is that after a fine-tuning of the performance of the booster valve has taken place by adjusting the bypass set screw, it remains possible for anyone to change the valve settings unauthorized. No specific tools or the like are needed for adjusting the valve. A simple screw driver suffices. Such an unauthorized change of settings however could also be done by someone who wants to try to tamper with the valve. Furthermore it may lead to unsafe situations, for example if the booster valve is used in hazardous situations like the oil & gas or petrochemical industry. It may also appear in practice that unexperienced personnel interprets the bypass set screw as a mounting screw and together with other mounting screws starts checking them for not being loose. This then could lead to this well-intended personnel starting to screw the set screw into the valve housing until it is fully fixed. This however would entirely block the bypass and prevent any bleed to occur, leading to overshoot of the outlet pressure and peak forces to occur. Another disadvantage of this valve construction is that the valve settings may get changed under vibrations or other external forces. It is therefore already suggested that a locking nut is to be provided on the free end portion of the bypass set screw for locking it in its position relative to the housing. Specific tools or the like then however still are not required for starting to adjust the valve. A simple wrench and screw driver would still suffice.

For example U.S. Pat. No. 4,239,710 shows a set screw of a valve that has gotten capped after having been adjusted. For the capping a sleeve-shaped holder portion is fixedly connected to or forms part of a wall part of the valve. The holder portion partly covers the outer periphery of the set screw. In the FIG. 5 embodiment the set screw is threadedly engaged in a complementary female threaded part inside the sleeve-shaped holder portion. A cover is subsequently press-fitted into a widened cylindrical free end part of the holder portion. The cover shields an operating head portion of the set screw. An elastic ring-shaped stopper with a plurality of pawls on its inner peripheral surface is provided inside the widened cylindrical free end part between the holder portion and the cover for tightly engaging with the outer periphery of the set screw to inhibit any casual movement thereof. The cover is either made of an easily destroyable material or so constructed that it can be easily broken. Thus the valve can be maintained in its initial proper setting, and it is possible to prevent any abnormal movement such as a casual return of the set screw due to vibrations or other external forces. Further it can prevent any improper adjustment by a user who is not familiar to such adjusting work or at a site with no proper measuring equipment, and also allows maintenance of controlled exhaust gas emission from an internal combustion engine after it is sold to a user.

A disadvantage herewith is that the functioning of the holder portion, cover and stopper leave to be improved. Together they form a relative complex and expensive construction. The multiple distinctive parts need to be assembled with each other in a specific manner and order. During this assembly, the cover may prematurely get broken because of being made of an easily destroyable material or so constructed that it can be easily broken. This particularly can occur when the cover is used to push the stopper forward towards its grip position where it tightly engages with the outer periphery of the set screw. Furthermore it is disadvantageous that the set screw can only be put into an operable condition by breaking the cover. This makes it necessary to replace the cover each time an adjustment is desired. Also this still makes it relative easy for someone to illegally tamper the settings of the valve, simply by breaking the cover and then screwing the set screw further into or out of the holder portion. No special tools are needed for that. A simple breaking of the cover suffices, after which a standard screw driver can be used to change the valve settings. Thus, despite the capping of the set screw by means of the holder portion and the cover, this still merely is able to offer a limited amount of protection against tampering.

SUMMARY OF THE INVENTION

The present invention aims to overcome the abovementioned disadvantages at least partly or to provide a usable alternative. In particular the invention aims to provide a safe and reliable protection cap for a set screw of a valve.

This aim is achieved by a valve according to the present invention. The valve comprises a housing with an inlet port and an outlet port. A supply passage extends between the inlet port and the outlet port. A supply valve core is provided in the supply passage and is operable between closed and open positions. An operating member is provided for moving the valve core between its closed and open positions. Furthermore a set screw is provided that is screwable in an axial direction into and out of a complementary female threaded opening in a part of the valve, for changing a setting of the valve, preferably for changing an adjustable flow restriction of the valve. The set screw comprises a free outer end that projects outside the valve part with a gripping part on this free outer end for a screw tool, preferably a screw driver, to be engageable thereupon. A protective cap is provided that covers the free outer end of the set screw. According to the inventive thought the free outer end of the set screw comprises a male thread onto which a locking nut is screwed for a first locking of the set screw relative to the valve part. The cap comprises a first cap portion with a rotation space that is designed to fit freely rotatable over the locking nut, and a second cap portion with a complementary female thread that is screwed onto the male thread on the free outer end of the set screw towards a locked position for a second locking of the set screw relative to the valve part.

Advantageously it can thus be obtained that the valve after installation and/or after maintenance can easily be fine-tuned in terms of performance by means of proper adjustment of the set screw. As soon as this fine-tuning via the set screw has been completed, the locking nut can be screwed onto the free outer end of the set screw, until it gets to abut against the valve part and locks itself and the set screw in a locking position. Subsequently the cap can be screwed onto the free outer end of the set screw, until it gets to abut against the valve part and locks itself and the set screw in its locking position. Thus a double locking is obtained for the set screw. This makes it much more difficult for someone to change the valve settings unauthorized. A tampering with the valve can thus be prevented. This leads to a saver and better functioning valve. A risk of the set screw being interpreted by unexperienced personnel as a mounting screw that needs fixation is no longer present. The double locking with not only the locking nut but also with the cap further helps to prevent that the valve settings may get changed under vibrations or other external forces. The cap construction can be strong and simple. The set screw can be put into an operable condition again by qualified personnel by first unscrewing the cap and subsequently unscrewing the locking nut. With this the cap can be used over and over again each time after an adjustment has been performed.

The complementary female threaded opening for example can be provided in a wall of the housing of the valve and from there extend towards a medium passage that is provided inside the housing.

The rotation space has a length in the axial direction that is larger than a thickness of the locking nut in the axial direction and that is shorter than a length of the male thread on the free outer end of the set screw in the axial direction. Thus it can be guaranteed that the cap can keep on freely rotating over the already locked in place locking nut, while getting screwed progressively onto the male thread, until the moment that the cap itself gets locked in place against the valve part.

The cap is provided with a circumferential wall and a front wall for together with the valve part enclosing the locking nut, the male thread and the gripping part on the free outer end of the set screw. Thus the set screw is entirely hidden underneath the cap, which also helps to prevent tampering therewith.

In addition, the front wall of the cap is provided with a pattern of recesses and/or projections that extend parallel to the axial direction for corresponding to a complementary pattern of projections and/or recesses of a driving tool for screwing the cap towards and away from its locked position. Thus it has become necessary to use a specific tool to remove the cap in case a change of settings for the valve should be required. Only having to use a simple screw driver no longer suffices.

The cap has a cylindrical smooth outer face. This helps to make it impossible for someone to try to unscrew the cap from the set screw merely by hand. If the cap has been locked firmly enough against the valve part, in particular by means of the specific driving tool, than such a manual release is not possible.

The rotation space has a diameter that is larger than a maximum width of the locking nut. Thus a freely rotatable fitting of the rotation space inside the cap over the already locked in place locking nut is obtained for as long as the cap has not yet reached its locked position. For that the rotation space may be cylindrical.

In a preferred embodiment the cap may be made of metal, preferably stainless steel. Other materials are however also possible, like plastic. Important is that the cap cannot easily be destroyed or broken.

In a preferred embodiment the valve may further comprise an operable piston-cylinder or membrane control system for controlling the operating member to move the supply valve core between its closed and open positions, and a pilot port which connects to one side of the piston-cylinder or membrane control system for moving the operating member in dependence of a pilot pressure delivered to the pilot port. The piston-cylinder or membrane control system then may be provided with a medium passage which connects one side of the piston-cylinder or membrane control system to the inlet or outlet port. The medium passage then may be provided with an adjustable restriction that is formed by or that is operated by an inner end of the set screw. According to the inventive thought the cap can then be screwed onto the male thread on the free outer end of the set screw while covering the free outer end of the set screw as well as covering the locking nut that is screwed thereupon. Thus a proper functioning of the piston-cylinder or membrane control system without overshoot of the outlet pressure and peak forces to occur can efficiently and safely be adjusted and then reliably protected against tampering.

Further embodiments are described herein.

The invention also relates to the inventive cap itself, as well as to an assembly of such a cap and a driving tool.

BRIEF DESCRIPTION OF THE DRAWINGS

The invention shall be explained in more detail below with reference to the accompanying drawings, in which.

DETAILED DESCRIPTION OF THE INVENTION

In FIG. 1-5 the three-position booster valve mechanism comprises a housing which has been given the reference numeral 1. The housing 1 comprises an inlet port 2, an outlet port 3 and an exhaust port 4. A supply passage 5 extends between the inlet port 2 and the outlet port 3. An exhaust passage 6 extends between the outlet port 3 and the exhaust port 4. The housing 1 mainly comprises an inlet block 1a, an outlet manifold 1b and an exhaust block 1c which are connected releasable and sealing to each other and through which the passages 5 and 6 extend.

Figure 1:
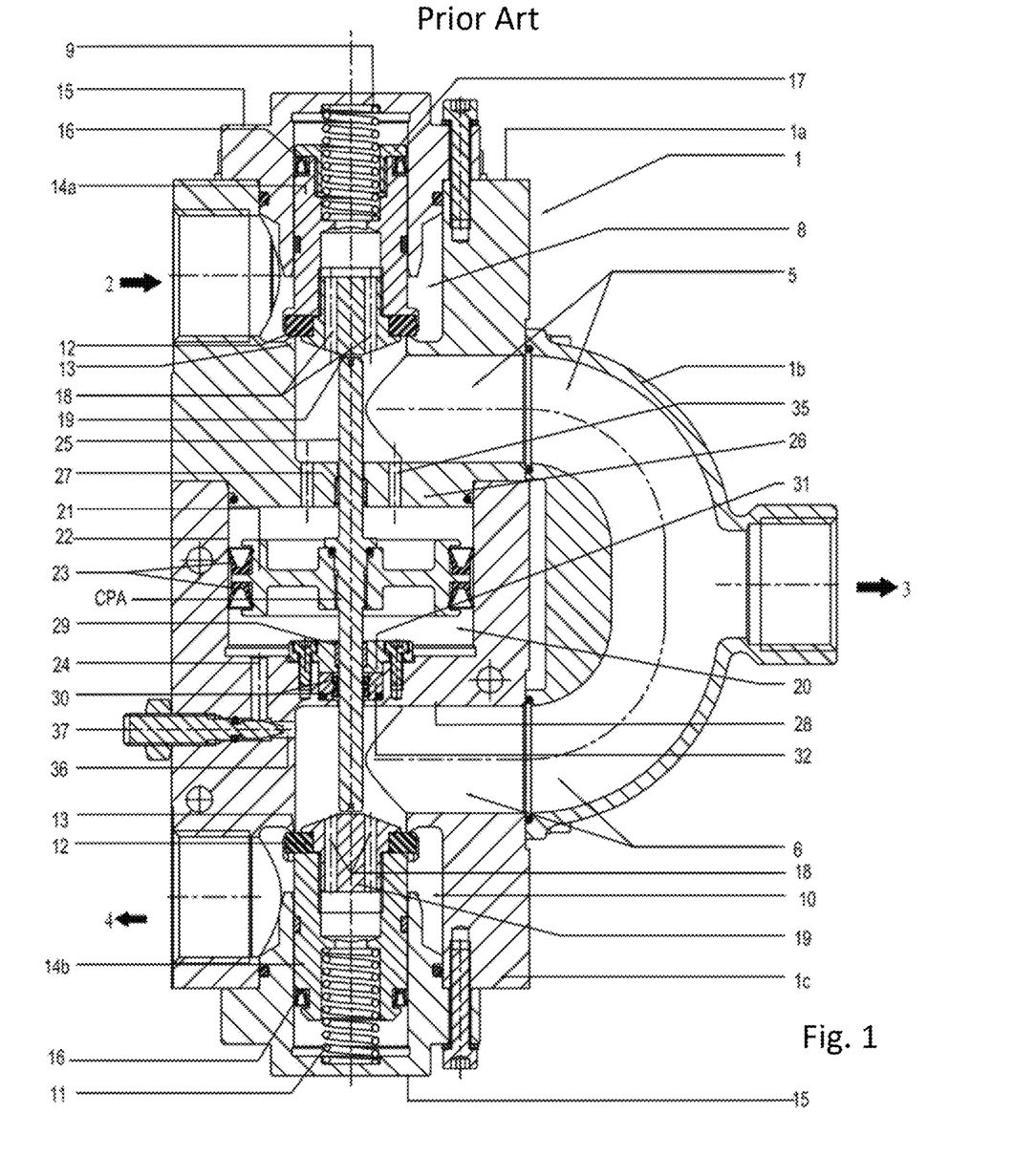
FIG. 1 shows a cross sectional front view of an embodiment of a three-position booster valve in a first position with closed inlet and exhaust ports and with a locked set screw ready to be capped.
Figure 2:
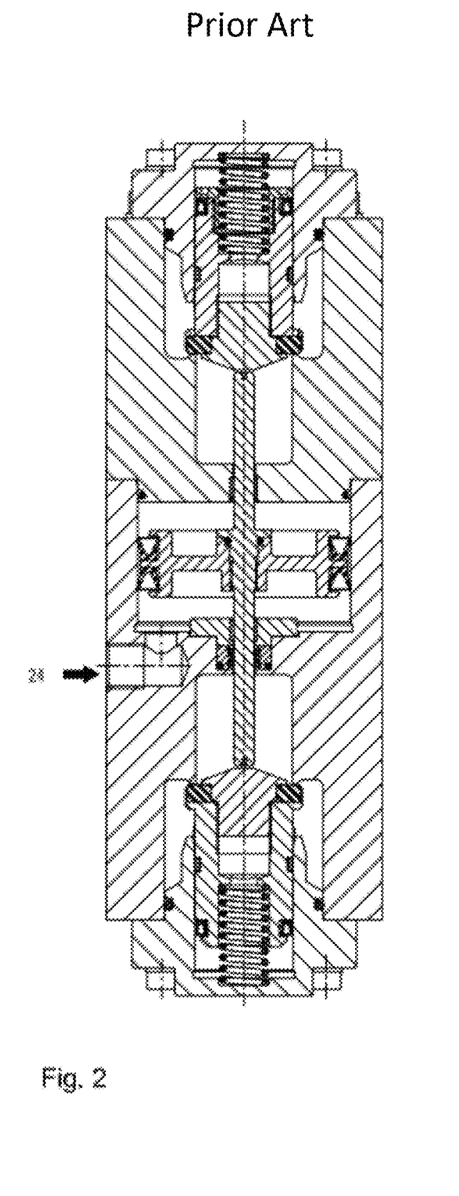
FIG. 2 shows a cross sectional side view of FIG. 1.

The inlet block 1a comprises a supply valve 8 which in FIG. 1 is biased by a spring 9 towards a position in which it closes the supply passage 5. The exhaust block 1c comprises an exhaust valve 10 which in FIG. 1-2 is biased by a spring 11 towards a position in which it closes the exhaust passage 6. The valves 8, 10 have a common central axis Ax along which they are axially moveable outwards into open positions as shown respectively in FIGS. 3 and 4, and back inwards again into the closed positions as shown in FIG. 1-2.

The valves 8, 10 each comprise a sealing disc 12 which in their closed positions lie sealing against complementary seats 13 provided in the housing 1. Furthermore the valves 8, 10 each comprise a piston-forming back valve part 14a, b which are axially moveably guided inside cylinder-forming cap ends 15. Dynamic lip seals 16 are active in between the back valve parts 14 and the cap ends 15. The back valve part 14a of the supply valve 8 is provided with a cap screw 17 to mount the lip seal 16 on the supply valve 8.

The valves 8, 10 are substantially pressure balanced owing to channels 18 which are provided in mushroom shaped front valve parts 19. The channels 18 connect at front sides to parts of the supply and exhaust passages 5, 6 which lie at the side of the outlet port 3. At their back sides the channels 18 connect to back faces of the valves 8, 10. Thus a pressure which is present inside the passages 5, 6 is exerted onto both front faces as well as to back faces of the valves 8, 10.

The supply and exhaust passages 5, 6 extend meandering around a centre part of the housing 1. In particular the manifold 1b delimits a Y-shaped passage which in a centre part connects the passages 5, 6 to the outlet port 3. Owing to the symmetrical shape of the manifold 1b, a flow capacity of the supply here is equal to the one of the exhaust.

In a centre part of the housing 1, a piston-cylinder control system 20 is provided. The control system 20 comprises a piston 21 which is axially moveably guided inside a cylinder 22 of the exhaust block 1c. Two oppositely directed dynamic lip seals 23 are active in between the piston 21 and the cylinder 22. A lower side of the cylinder 22 is connected to a pilot port 24.

A stem 25 is provided which extends in the axial direction Ax in between the valves 8, 10. The stem 25 is fixedly connected at a central point of application CPA to the piston 21. This central point of application here lies in the middle of the stem 25 (seen in the axial direction Ax) in between its outer free ends. Thus the stem 25 extends in opposing directions from said middle point towards the supply valve 8 and the exhaust valve 10. The stem 25 has an axial length which is shorter than an axial distance between the front faces of the valves 8, 10 in their mutually closed position, such that small clearances of for example between 0.5-1.5 mm remain between outer ends of the stem 25 and the valves 8, 10 in this mutually closed position.

The cylinder 22 is delimited inside the housing 1 between the inlet block 1a and the exhaust block 1c, here the cylinder 22 is an integral part of the housing 1. Owing to the releasable connection between the blocks 1a and 1c, the piston 21 can easily be placed inside the cylinder 22.

A wall part 26 of the housing 1 which extends between the supply passage 5 and the cylinder 22 is provided with an upper guiding opening for the stem 25. The upper guiding opening is equipped with a slide bearing 27 such that the stem 25 can easily slide up and down in the axial direction Ax through it. A wall part 28 of the housing 1 which extends between the exhaust passage 6 and the cylinder 22 is provided with a lower guiding opening for the stem 25. The lower guiding opening is equipped with a slide bearing 29 such that the stem 25 can easily slide up and down in the axial direction Ax through it. Two oppositely directed dynamic lip seals 30 are active in between the stem 25 and the lower guiding opening. an upper retainer 31 and a lower retainer 32 keep the slide bearing 29 and the seals 30 in place. An O-ring below the lower retainer 32 seals it in the exhaust block 1c. Thus the assembly of the piston 21 and stem 25 is axially moveably guided at only two points. The slide bearings 27, 29 can for example be formed by plastic bushes which are able to deal with temperatures ranging between −60 degrees Celsius and +90 degrees Celsius.

An upper side of the cylinder 22 is connected by first medium passages 35 to the parts of the supply and exhaust passages 5, 6 which lie at the side of the outlet port 3. Thus a pressure which is present inside the passages 5, 6 can be exerted onto a top face of the piston 21. Besides being connected to the pilot port 24, the lower side of the cylinder 22 is connected by a second medium passage 36 to the same parts of the supply and exhaust passages 5, 6 which lie at the side of the outlet port 3. An adjustable dampening bypass set screw 37 is provided as adjustable restriction inside this second medium passage 36. Thus the pressurized medium which is present inside the passages 5, 6 can slowly flow into the lower side of the cylinder 22, depending on the amount of restriction which is set by the set screw 37. A locking nut 38 will lock the set screw 37 in its position relative to the housing 1.

Figure 3:
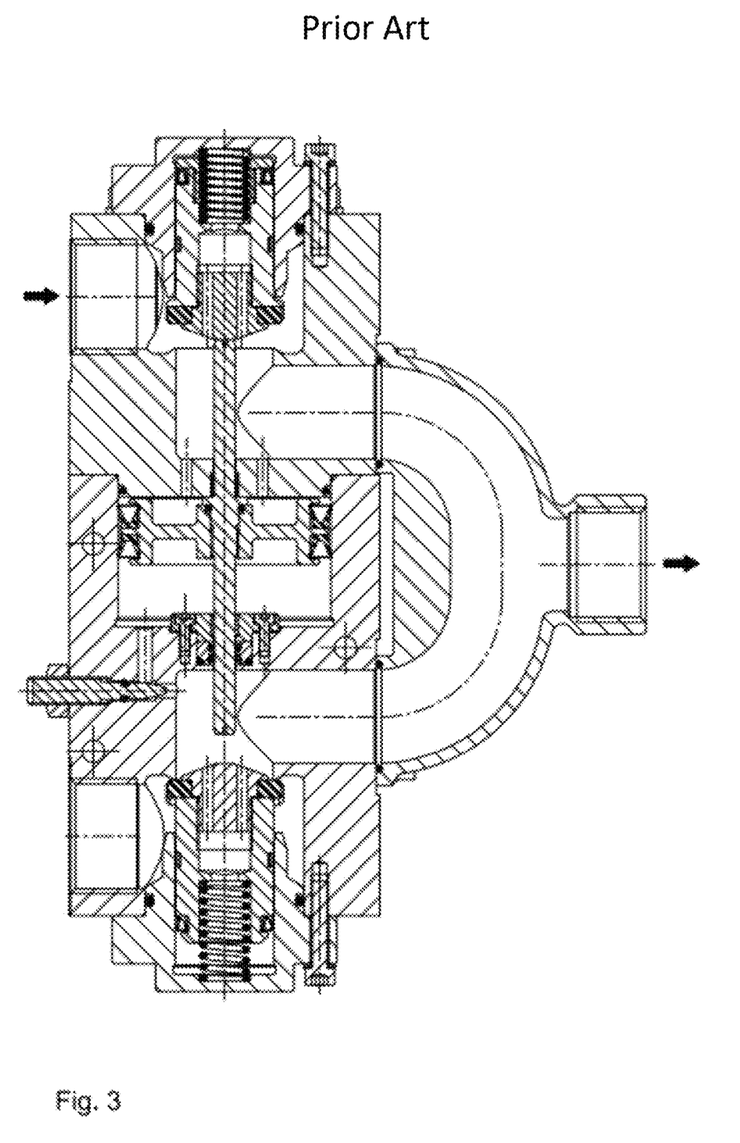
FIG. 3 is a view according to FIG. 1 in a second position with open inlet and closed exhaust ports.

The three-position booster valve mechanism can now be operated as follows:

A pressurized medium, for example a gas like air, can be supplied at a pressure Pin to the inlet port 2. If, starting from the first position as shown in FIG. 1-2 in which both valves 8, 10 are closed, the pilot port 24 is pressurized with a pressurized medium, for example a gas like air, at a pressure Ppilot, then the cylinder 22 gets filled below the piston 21, and the piston 21 moves upwards. With this the stem 25 pushes the supply valve 8 open. Thus the second position as shown in FIG. 3 is obtained. Medium then starts to flow from the inlet port 2 to the outlet port 3. Components coupled to the outlet port 3, like for example a large valve positioner in a pipeline, then will be pressurized/operated.

Since the area above the piston 21 is open to the outlet port 3, the area above the piston 21 gets pressurized at the pressure Pout which is substantially the same as Pin.

As soon as Pout gets to be equal to Ppilot, there is a balance, the stem 25 moves back to the first position again, and there is no force exerted by the stem 25 on the inlet and exhaust valves 8, 10. The inlet valve 8 then closes again under the influence of its spring 9, whereas the exhaust valve 10 stays closed. Thus the first position as shown in FIG. 1-2 is obtained again.

Figure 4:
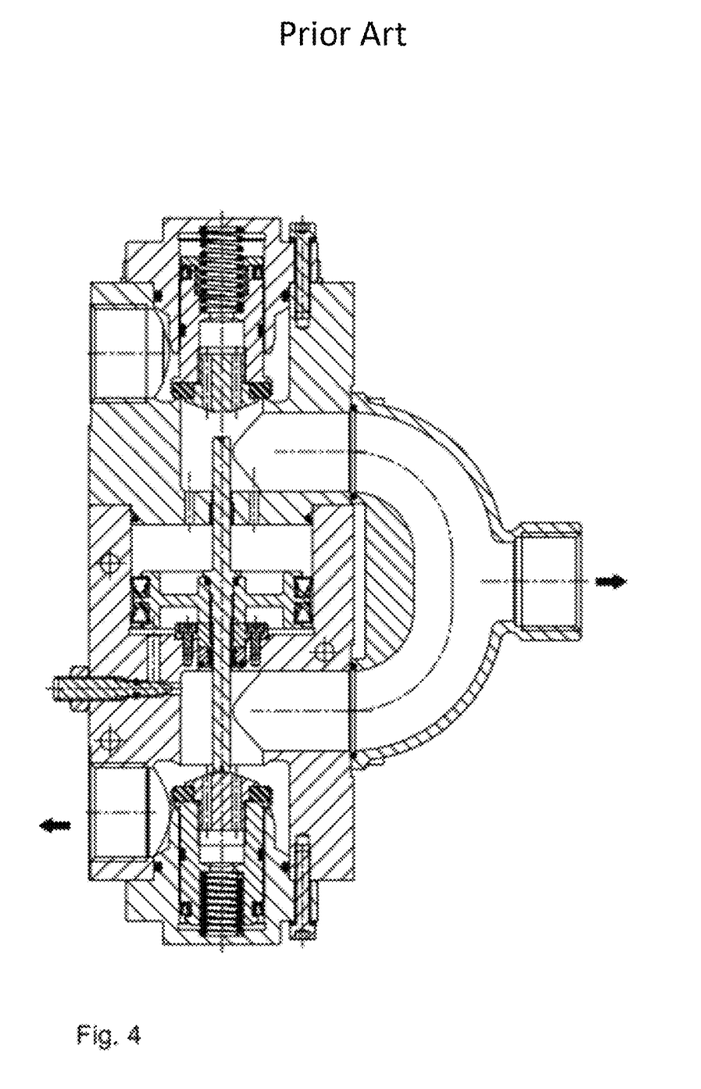
FIG. 4 is a view according to FIG. 1 in a third position with closed inlet and open exhaust port.

If, starting from the first position as shown in FIG. 1-2 in which both valves 8, 10 are closed, while the outlet port 3 is pressurized, the pilot port 24 is de-pressurized, then the cylinder 22 below the piston 21 gets emptied and the piston 21 moves downwards, as a result of the pressure Pout above the piston 21. The stem 25 then pushes the exhaust valve 10 open. Thus the third position as shown in FIG. 4 is obtained. Medium then starts to flow from the outlet port 3 to the exhaust port 4. Components coupled to the outlet port 3, like for example the large valve positioner in the pipeline, then will be de-pressurized/operated.

As soon as Pout gets to be equal to Ppilot again, there is a balance, the stem 25 moves back to the first position again, and there is no force exerted by the stem 25 on the inlet and exhaust valves 8, 10. The exhaust valve 10 then closes again under the influence of its spring 11, whereas the inlet valve 8 stays closed. Thus the first position as shown in FIG. 1-2 is obtained again.

If the pilot port 24 is not pressurized, the supply valve 8 is closed or will be closed, and the exhaust valve 10 will be opened to de-pressurize the outlet. After de-pressurization has completed, the exhaust valve 10 will be automatically closed. This can be used as a safety measure.

Owing to the fact that both the supply and exhaust valves 8, 10 are pressure balanced, a very low force is needed to open them. With only a small increase or decrease of the pilot pressure, the supply valve 8 or the exhaust valve 10 can already be opened.

The second medium passage 36 serves as a bypass for the piston 21, that is to say a bypass between Ppilot and Pout. A flow through this bypass, results in a certain bleed which may limit overshoot of the outlet pressure Pout and thus may help to limit peak forces. In general it can be used to affect a reaction (curve) of the control valve.

The set screw 37 is screwable in an axial direction Y into and out of a complementary female threaded opening in the housing 1. A free outer end of the set screw 37 projects outside the housing 1. A gripping part 39, that here is formed by a slit, is provided on the free outer end of the set screw 37. Thus a tool like a screw driver can be engaged upon the set screw for, after the locking nut 38 has been released, having the set screw 37 screwed further into or out of the housing 1 during a fine-tuning operation of the restriction of the bypass.

Figure 5:
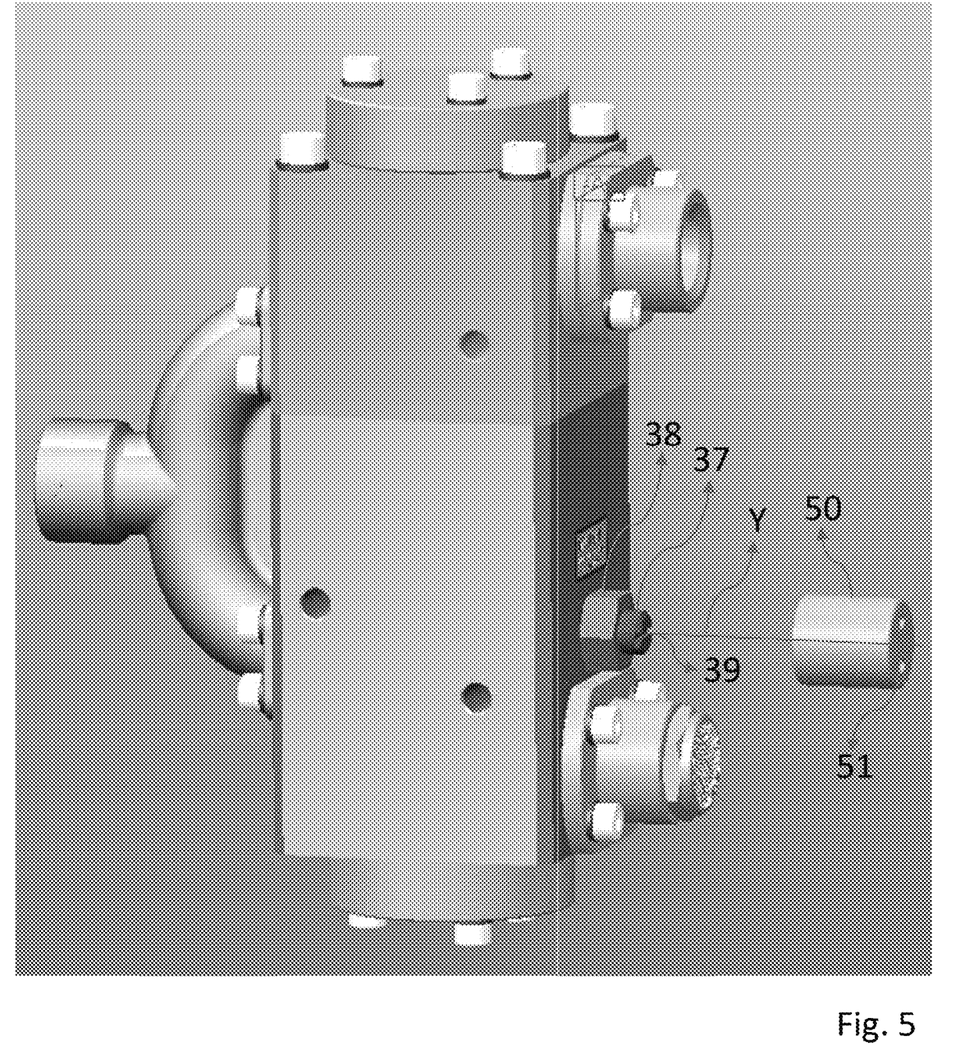
FIG. 5 shows a schematic perspective view of the valve according to FIG. 1-4 with a cap according to the invention ready to be mounted over the dampening bypass set screw.

As can be seen in FIG. 5, a protective cap 50 is provided that mainly comprises an integral assembly of a circumferential wall 50a and a front wall 50b for covering the free outer end of the set screw 37 including the locking nut 38. The cap 50 has a cylindrical smooth outer face. The front wall of the cap 50 is provided with two recesses 51 that extend parallel to the axial direction Y at opposing sides of a centre of the cap 50.

Figure 6:
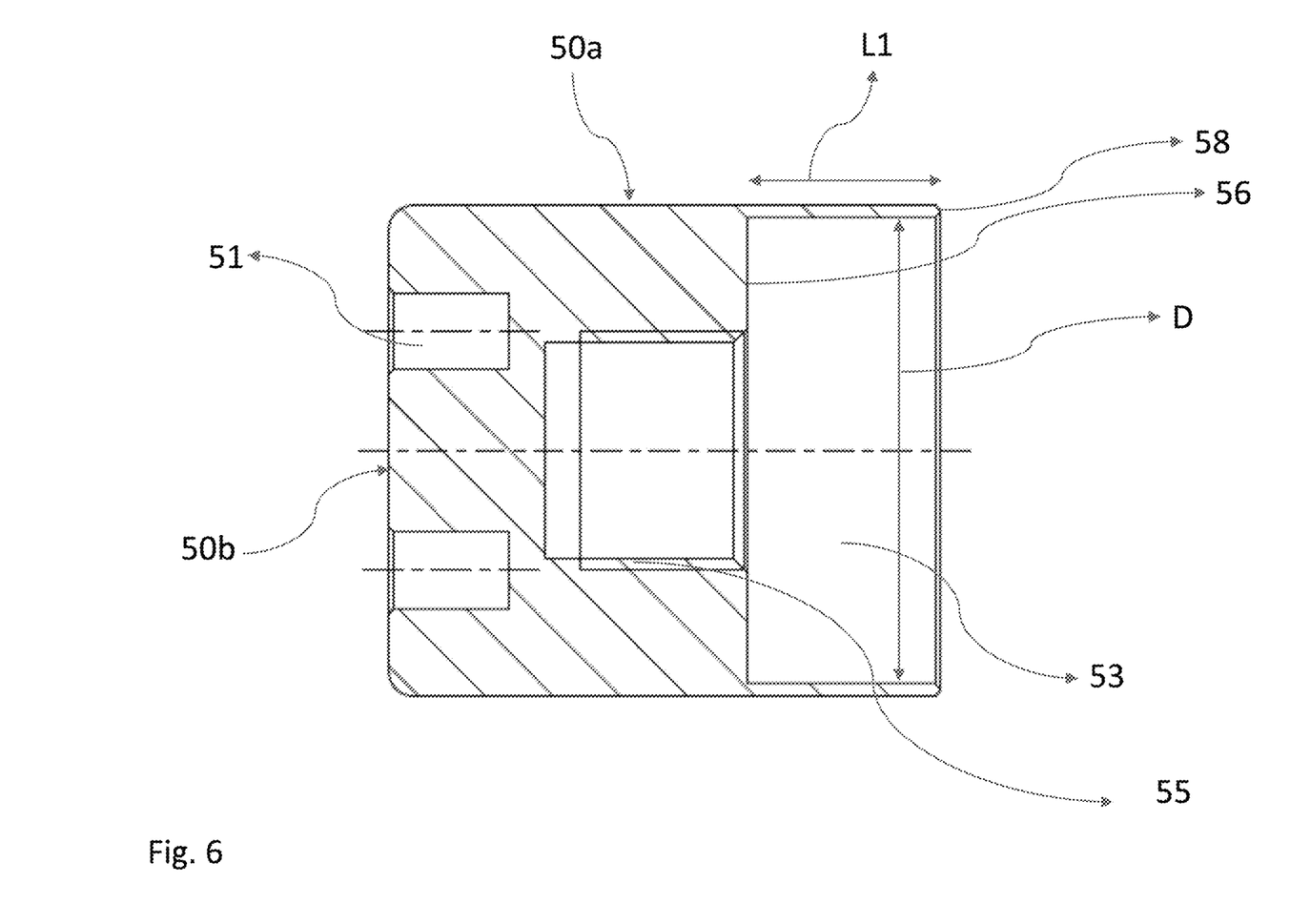
FIG. 6 shows a schematic perspective view of the cross-sectioned cap of FIG. 5.

As can be seen in FIG. 6, the cap 50 comprises a first cap bore portion with a cylindrical rotation space 53 that opens out on one side and has a diameter D that is larger than the maximum width of the locking nut 38 such that it fits freely rotatable over the locking nut 38. The cap 50 further comprises a second cap bore portion with a female thread 55. The second cap bore portion is blind towards the front wall 50b.

Figure 7:
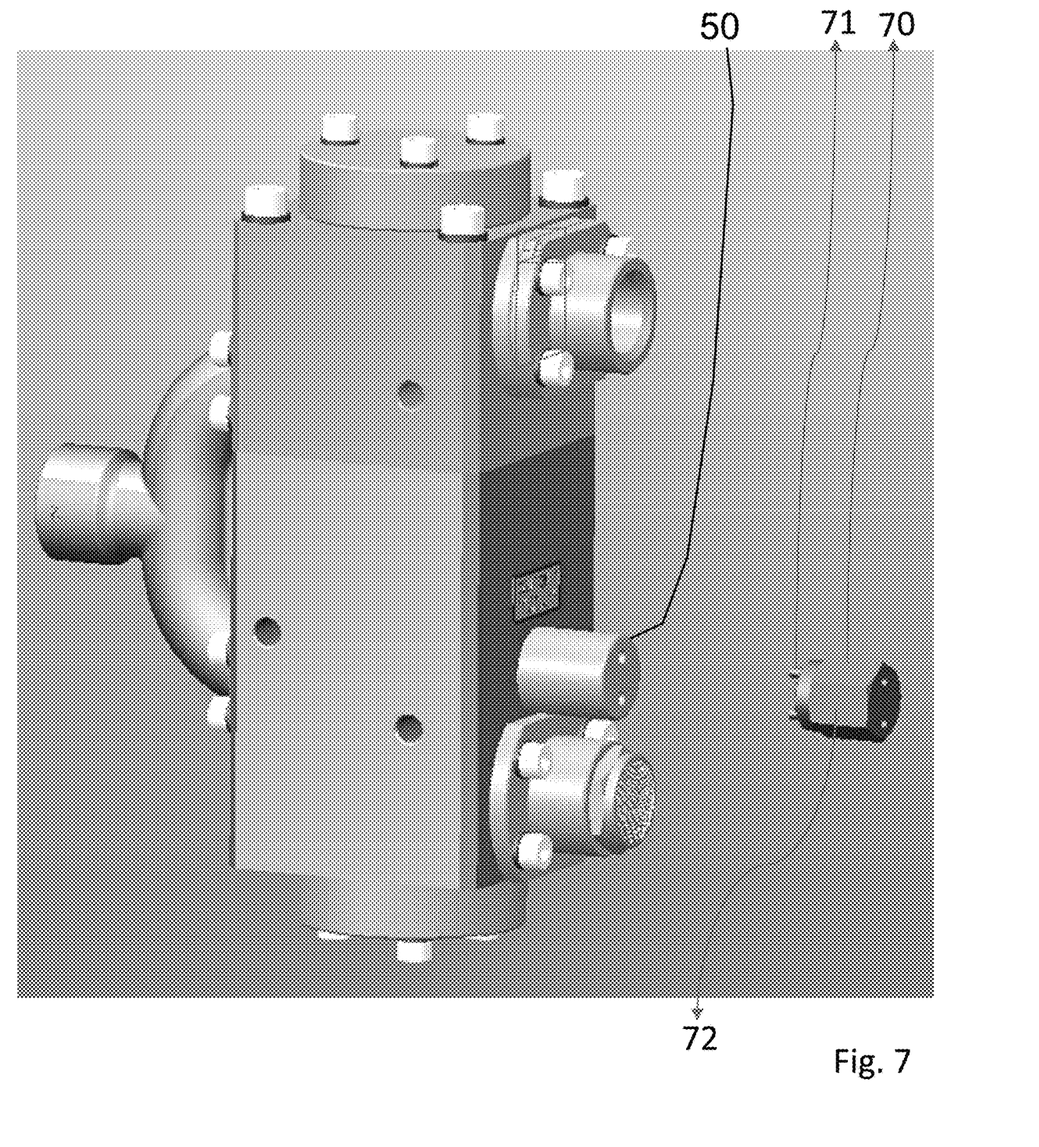
FIG. 7 shows a view according to FIG. 5 with the cap mounted over the dampening bypass set screw and a driving tool waiting in front of it ready for engagement with the cap again.
Figure 7A:
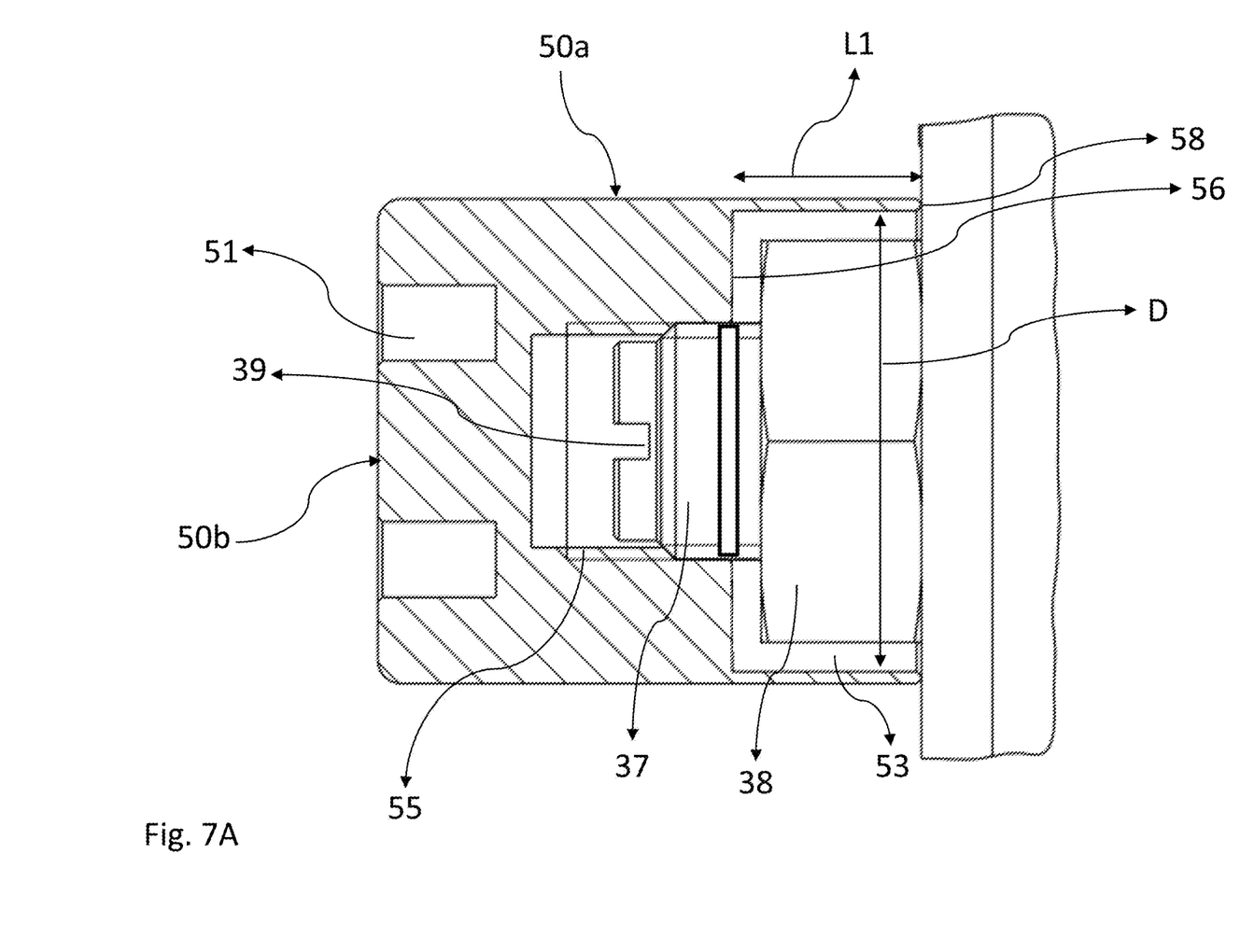
FIG. 7A shows a partial cross-sectional view of FIG. 7 at the location of the cap mounted over the dampening bypass set screw.

The cap 50 can be screwed onto the set screw 37 towards a locked position as is shown in FIG. 7. In this locked position the cap 50 has come to lie with its rotation space 53 over the locking nut 38 while its female thread 55 has been firmly screwed onto the set screw 37.

The rotation space 53 here has a length/depth L1 in the axial direction Y that is larger than a thickness of the locking nut 38 in the axial direction Y. Thus it is guaranteed that an inner end wall 56, that delimits the rotation space 53 towards the side of the front wall 50b, does not come to lie against the locking nut 38 in the locked position. The length/depth L1 of the rotation space 53 furthermore is shorter than the length of the free outer end of the set screw 37 that projects outside the housing 1, including the part upon which the locking nut 38 is screwed upon. Thus it can be guaranteed that the cap 50 can engage with enough female thread 55 onto the free outer end of the set screw 37. In the locked position a back circumferential edge 58 of the cap 50 has come to lie against the housing 1.

The cap 50 can be screwed in place onto the set screw 37 with the aid of a special driving tool 70 that is shown in FIG. 7. The driving tool 70 is provided with two projections 71 that extend parallel to the axial direction Y at opposing sides of a centre of the tool 70. Thus the tool 70 is complementary to the cap 50 and can be used for having a rotational force exerted upon the cap 50 either for screwing or unscrewing it towards and away from its locked position.

For this the driving tool 70 further comprises a gripping part 72 on its free outer end, here a hexagonal portion, for a tool like a spanner (not shown), to be engageable thereupon.

Figure 8:
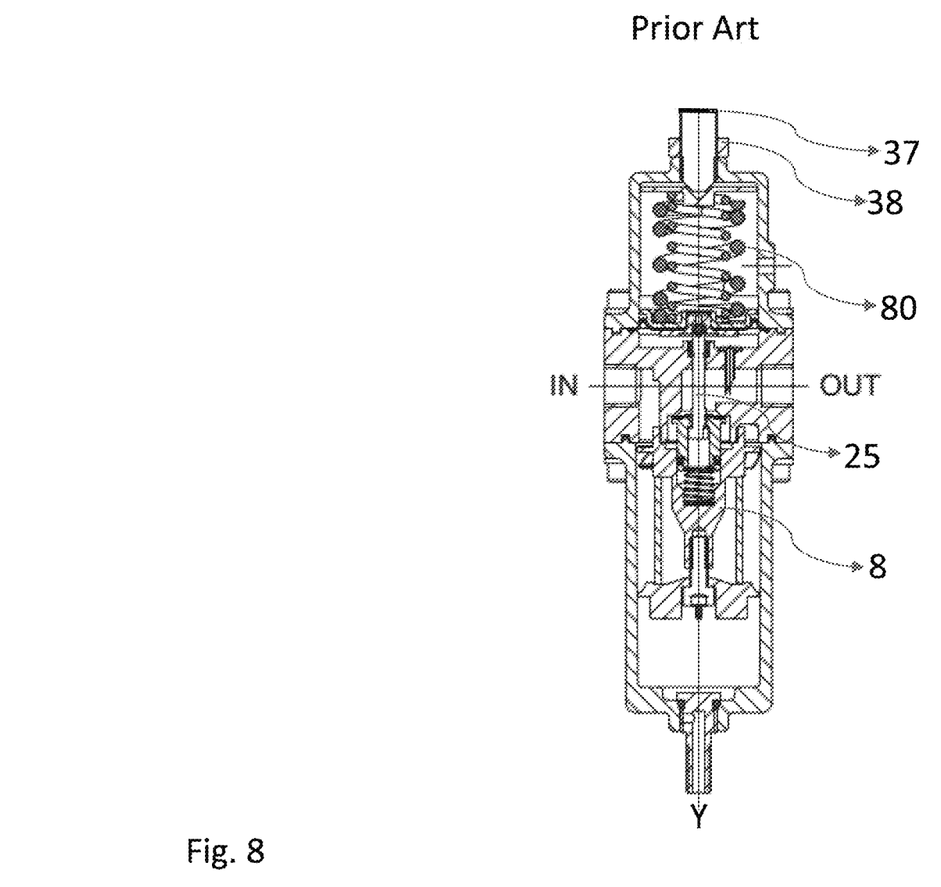
FIG. 8 shows a cross sectional front view of an embodiment of a pressure regulator valve with a locked set screw ready to be capped.

FIG. 8 shows a pressure regulator valve with an inlet port IN and an outlet port OUT between which a passage extends. A valve core 8, that is operable between closed and open positions, is provided in the passage. For this an operating member 25 is connected to the valve core 8. A set screw 37 is screwable in an axial direction Y into and out of a complementary female threaded opening in an upper housing part of the valve. The set screw 37 is destined to set a certain pre-biasing force for a dual spring 80 that with one end rests upon the operating member 25, whereas its other end rests against the set screw 37. Thus the regulator valve can be fine-tuned at each aimed pre-biasing force by screwing the set screw 37 further into or out of the housing. The set screw 37 comprises a threaded free outer end that projects outside the upper housing part. A locking nut 38 is screwed onto it for a primary locking of the set screw 37 relative to the upper housing part.

After being set at a certain pre-bias, and after being locked with the nut 38, the set screw 37 can now also advantageously be capped with the cap 50 as shown for example in FIG. 6. The cap 50 can be screwed onto the set screw 37 towards its locked position against the upper housing part in which the cap 50 has come to lie with its rotation space 53 over the locking nut 38 while its female thread 55 has been firmly screwed onto the set screw 37.

Besides the embodiments shown numerous variants are possible. For example the various shapes and dimensions of the cap can be varied. Instead of the booster valve, the cap can also be used on other types of valves and/or for capping other types of set screws of a valve.

For example the cap can also be used for capping a set screw of a pilot-pressure operable membrane control system of a booster valve. The set screw then can be used in a similar manner, that is to say for fine-tuning operations of a restriction of a medium passage that connects one side of the membrane control system to an inlet or outlet port of the booster valve. Then also it is important to have the set screw not only locked with a nut but also capped and locked with the cap according to the invention such that tampering and the like can efficiently be prevented.

In another example it is also possible to cap a set screw of a flow regulator valve with the capping according to the invention. The flow regulator valve then can be provided with a medium passage between an inlet and outlet port. A valve core is provided in the passage that is adjustable in various positions between closed and open positions. For those adjustments an operating member is provided. The set screw is connected to the operating member such that an adjustment of the set screw results in an adjustment of the valve core to a lesser or larger restriction of the passage. The cap according to the invention then can also be screwed onto a male thread on a free outer end of the set screw while covering both the free outer end of the set screw and the locking nut that is already screwed thereupon.

Thus it is easily and quickly possible to cap all kinds of already locked set screws of all kinds of valves with the cap according to the invention.

Instead of having the cap getting to lie against the housing or other part of the valve in its locked position, it is also possible to have the cap in its locked position come to lie with its inner end wall that delimits the rotation space against a front face of the locking nut. For this the length/depth of the rotation space then can be chosen to be slightly shorter than the thickness of the locking nut.

Thus according to the invention a valve with a capped set screw is obtained which is optimally protected against unauthorized tampering and accidental operation including vibrations.

The invention claimed is:

1. A valve for on/off and/or control applications, comprising:
   a housing having an inlet port and an outlet port;
   a supply passage extending between the inlet port and the outlet port;
   a supply valve core provided in the supply passage and operable between closed and open positions;
   an operating member for moving the supply valve core between its closed and open positions; and
   a set screw that is screwable in an axial direction into and out of a complementary female threaded opening in a valve part for changing a setting of the valve,
   wherein the set screw comprises a free outer end that projects outside the valve part,
   wherein the set screw comprises a gripping part on its free outer end for a first driving tool to be engageable thereupon, and
   wherein a protective cap is provided that covers the free outer end of the set screw,
   wherein the free outer end of the set screw comprises a male thread onto which a locking nut is screwed for a primary locking of the set screw relative to the valve part,
   wherein the cap comprises a first cap portion with a rotation space that is designed to fit freely rotatable over the locking nut, said rotation space having a diameter that is larger than a maximum width of the locking nut,
   wherein the cap comprises a second cap portion with a complementary female thread that is screwed onto the male thread on the free outer end of the set screw towards a double locked position for a secondary locking of the set screw relative to the valve part wherein the rotation space has a length in the axial direction that is larger than the locking nut in the axial direction and that is shorter than a length of the male thread on the free outer end of the set screw in the axial direction,
   wherein the cap is provided with a circumferential wall and a closed front wall for together with the valve part enclosing the locking nut, the male thread and the gripping part on the free outer end of the set screw, the second cap portion comprising a bore portion with said female thread, the bore portion being blind towards said front wall of the cap, and,
   wherein in said double locked position:
   a back circumferential edge of the cap abuts against the valve part and is locked in place against said valve part; and
   an inner end wall, that delimits the rotation space towards a side of the front wall, does not lie against the locking nut,
   wherein the closed front wall of the cap is provided with a pattern of recesses and/or projections that extend parallel to the axial direction for corresponding to a complementary pattern of projections and/or recesses of a second driving tool for screwing the cap towards and away from its locked position, and
   wherein both the first and second cap portions of the cap have a common cylindrical smooth outer face.

2. The valve according to claim 1, wherein the rotation space is cylindrical.

3. The valve according to claim 1, wherein the cap is made of metal.

4. The valve according to claim 1, further comprising:
   an operable piston-cylinder or membrane control system for controlling the operating member to move the supply valve core between its closed and open positions; and
   a pilot port which connects to one side of the piston-cylinder or membrane control system for moving the operating member in dependence of a pilot pressure delivered to the pilot port,
   wherein the piston-cylinder or membrane control system is provided with a medium passage which connects one side of the piston-cylinder or membrane control system to the inlet or outlet port,
   wherein the medium passage is provided with an adjustable restriction formed by or operated by an inner end of the set screw, and
   wherein the cap has been screwed onto the male thread on the free outer end of the set screw while covering the free outer end of the set screw and covering the locking nut that is screwed thereupon.

5. The valve according to claim 4, wherein the medium passage is a bypass that connects the one side of the piston-cylinder or membrane control system to which the pilot port is connected with the outlet port.

6. The valve according to claim 4, wherein the valve is a three-position booster valve that further comprises:
   an exhaust port in the housing;
   a first spring for biasing the supply valve core towards the closed position in which it closes the supply passage;
   an exhaust passage that extends between the outlet port and the exhaust port;
   an exhaust valve core that is provided in the exhaust passage and that is operable between closed and open positions; and a second spring for biasing the exhaust valve core towards the closed position in which it closes the exhaust passage, wherein the operating member is designed for moving the supply valve core and the exhaust valve core between their closed and open positions, and wherein the operable piston-cylinder or membrane control system is designed for moving the operating member between a first position in which the supply valve core and the exhaust valve core are closed, a second position in which the supply valve core is open and the exhaust valve core is closed, and a third position in which the supply valve core is closed and the exhaust valve core is open.

7. The valve according to claim 1, wherein the second driving tool further comprises a hexagonal portion and/or a hole that extends in a cross direction perpendicular to the axial direction.

8. The valve according to claim 1, wherein the set screw being entirely hidden underneath the cap.

9. The valve according to claim 1, wherein the second cap portion comprising a bore portion with said female thread, which the bore portion is blind towards a front wall of the cap.

* * * * *